Sept. 19, 1967 T. F. KELLEY 3,341,967
INSECT TRAP
Filed May 20, 1966
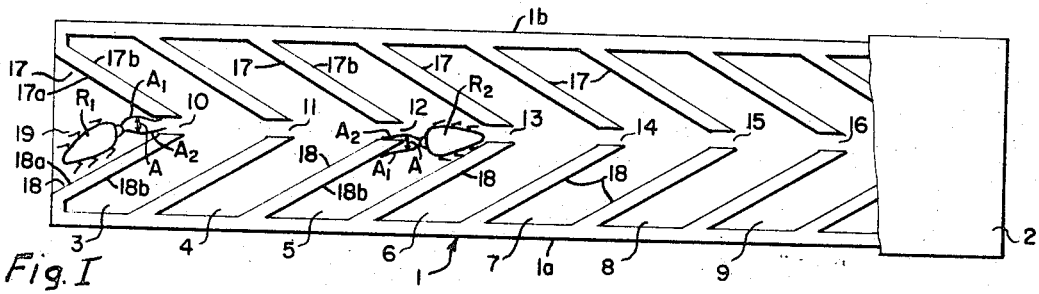
Fig. 1
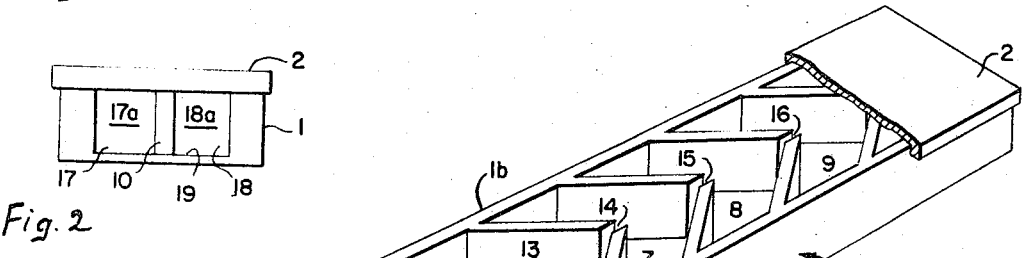
Fig. 2
Fig. 3
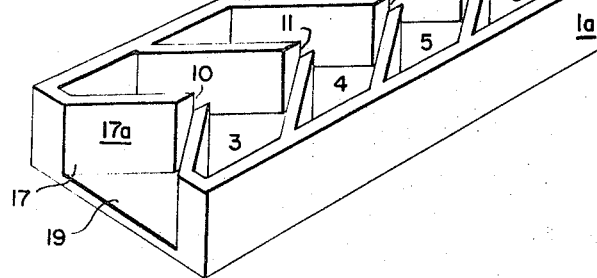
Fig. 4
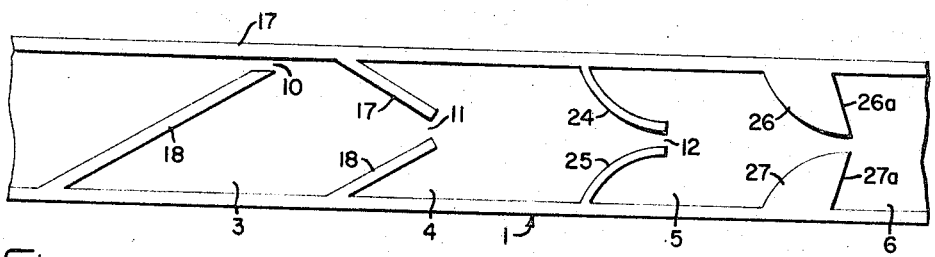
Fig. 5
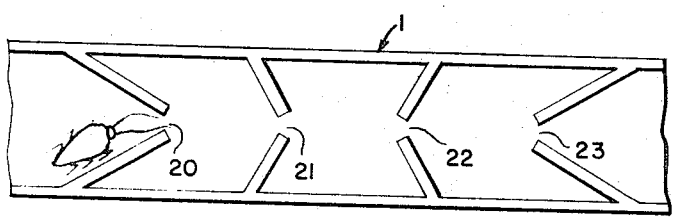
INVENTOR
*Thomas F. Kelley*

United States Patent Office 3,341,967
Patented Sept. 19, 1967

3,341,967
INSECT TRAP
Thomas F. Kelley, 751 2nd Ave.,
New York, N.Y. 10007
Filed May 20, 1966, Ser. No. 562,023
1 Claim. (Cl. 43—65)

This is a continuation-in-part of my now abandoned application Serial No. 391,064 filed August 5, 1964 entitled "Insect Trap".

The present invention relates generally to improvements for an insect trap, and more particularly to a device for trapping roaches and similar insects and thereby enabling the safe elimination of the same.

The elimination of roaches and similar insects is desirable for sanitary reasons. To this end, numerous poisons and similar preparations are in use, and although the same are generally effective, the use thereof is not entirely satisfactory. Even apart from considerations of how effective these preparations are in destroying roaches, when placed about premises these preparations represent a health hazard to unsupervised small children, and further are a source of unsightliness. In lieu of chemical preparations, trap devices have heretofore been proposed but are not in wide use, presumably because of their ineffectiveness in eliminating roaches and similar insects. Basically, these traps attempt to achieve trapping of a roach by providing a complicated entrance into the trap which is not easily maneuvered through by a trapped roach. However, the complicated nature of the entrance does not promote entry of the roach into the trap in the first instance, and thus undoubtedly accounts for the ineffectiveness of prior art traps.

Broadly, it is an object of the present invention to provide an improved insect trap overcoming the foregoing and other shortcomings of the prior art. Specifically, it is an object to provide an insect trap with a comparatively simple entrance into the same, but one which nevertheless is effective in substantially minimizing escape from within the trap.

An insect trap demonstrating objects and advantages of the present invention is preferably formed as a receptacle having walls defining an enclosure and in which at least two of said walls bound an entrance opening therebetween into said enclosure. An essential contribution of the present invention is the discovery of certain behavior traits of roaches which are subsequently detailed herein, and in recognition of these behavior traits the arrangement of the wall structure on both sides of the entrance opening so as to achieve optimum effectiveness from the trap. That is, the wall structure leading to the entrance is such as to actually promote entry of the roach or similar insects into the trap. Additionally, the wall structure bounding the entrance opening on the interior side thereof is such as to minimize escaping movement therethrough from within the trap.

The above brief description, as well as further objects, features and advantages of the present invention will be more fully appreciated by reference to the following detailed description of presently preferred, but nonetheless illustrative embodiments in accordance with the present invention, when taken in conjunction with the accompanying drawings, wherein:

FIG. 1 is a plan view of a first embodiment of an insect trap of the present invention, a top panel of the trap being broken away to better illustrate the internal construction thereof;

FIG. 2 is a front elevational view projected from FIG. 1;

FIG. 3 is a perspective view of said first embodiment showing further features of the construction thereof;

FIG. 4 is a partial plan view of a second embodiment of an insect trap of the present invention; and FIG. 5 is a partial plan view of a third embodiment of an insect trap of the present invention.

Reference is made to the drawings, and in particular to FIGS. 1–3 wherein there is shown a first embodiment of an insect trap according to the present invention generally designated 1. The insect trap 1 is formed generally as a rectangular receptacle having opposite side walls 1a and 1b, a bottom panel 19 connected therebetween, and a cover 2 adapted to be releasably positioned over the side walls 1a, 1b. The foregoing structure defines an enclosure within which insects are induced to enter and which they cannot easily escape from. In a preferred form, each of the illustrated embodiments of the insect trap hereof has the enclosure which is defined by the outer wall structure thereof further subdivided into plural smaller enclosures which in the embodiment of FIGS. 1–3 are designated 3–9. As will be described in greater detail subsequently herein, each enclosure 3–9 is formed by two cooperating walls which bound therebetween an entrance opening into the enclosure, this entrance opening and the walls forming the same being such as to promote and facilitate the entry of a roach or similar insect into the enclosure. Once the insect is within the enclosure, said entrance opening and walls are effective to render it difficult, if not impossible, for the roach to escape from the enclosure by reverse direction movement through the entrance opening.

In the embodiment of FIGS. 1–3, the plural successively arranged entrance openings for the enclosures 3–9 are respectively designated 11–16, and each entrance opening is essentially identical in construction. For brevity sake, only the main entrance opening 10 into the first encountered enclosure 3 will be specifically described herein, it being understood that this description is adequate for a complete understanding of the present invention. The provision of the plural entrance openings 11–16 in addition to the main entrance opening 10 renders it more difficult for a roach which has made its way through these openings, say into the furthest interior enclosure 9, to make its way in a reverse direction through these plural entrance openings. Additionally, it is advantageous to make each successively encountered opening in the series of openings 11–16 progressively narrower in extent, both for the foregoing purpose of rendering it more difficult to escape from the trap, and also to accommodate the trap to various sizes of roaches or insects. That is, the progressively smaller openings 14–15 at the end of the series of openings are the proper size for the smaller-sized roaches or insects which may be able to maneuver through the larger-sized openings 10–13.

Turning now to the construction of the entrance opening 10 which, as previously indicated, is exemplary also of the construction of the succeeding entrance openings 11–16, it is clearly shown in the drawings that this opening is bounded by the free edges of inwardly converging walls 17, 18. In a preferred embodiment, each of these walls 17, 18 is molded integral with the receptacle bottom panel 19. The walls 17, 18 each have an external surface 17a and 18a, respectively, which cooperate to provide a tapered passageway of progressively diminished extent leading into the main entrance opening 10. A typical roach, herein designated R1 in FIG. 1, has a pair of feelers A1 and A2 which is used by the roach preparatory to any forward movement to determine if such forward movement should be made. A part of the present invention is the recognition that the feelers A1 and A2 are normally spaced apart in a V-shape orientation a predetermined distance A during the time that the roach R1 is in movement and that this spacing A between the feelers A1 and A2 cannot be voluntarily changed by the roach. Further, a roach such as exemplified by the roach R1 will not pass through any opening unless both of the ends of the feelers A1 and A2 project through the opening. Thus, the convergence of the surfaces 17a and 18a upon the main entrance opening 10 has the effect during forward movement of the roach R1 of actually camming the feelers A1 and A2 closer together with the result that these feelers do project through the opening 10 so that the roach R1 will proceed in movement through this opening. On its own accord, the roach R1 could not lessen the distance A between its feelers A1 and A2 and thus would not have passed through the entrance opening 10.

The manner in which the structure providing the entrance openings minimize insect movement from within the enclosure out of said opening is best understood by considering the situation as depicted in FIG. 1 in connection wtih a roach R2 which has made its way rearwardly into the trap 1, as for example into the location of the enclosure 5 of the trap. Roach R2 in attempting to maneuver out of the enclosure 5 through the entrance opening 12 thereof cannot project both of its feelers A1 and A2 through this opening since the width of the opening is less than the normal spacing A between these feelers. Further, the entrance opening 12 when approached from within the enclosure presents wall surfaces 17b and 18b which are outwardly divergent with respect to this direction of approach. Thus, there is not only no camming action provided by these surfaces as was the case with the wall surfaces 17a and 18a, but the roach R2 having one feeler A1 projected against the wall surface 18b is incapable of moving this feeler rearwardly back and around the free edge of the wall 18 which bounds the opening 12 so as to project the feeler A1 through the opening 12 together wtih the other feeler A2. The roach R2 in failing to get both feelers A1 and A2 through the opening 12 thus cannot proceed through this opening but instead will maneuver about in the confines of the enclosure 5 until approaching the opening 13 of the next succeeding enclosure 6. For reasons previously stated, and in particularly by virtue of the camming action of the converging walls 17 and 18 which bound the opening 13, the roach R2 can make its way through this opening and in this manner will proceed deeper into the trap making it that more difficult for it to escape therefrom.

To encourage entrance of a roach or similar insect into the trap 1 in the first instance, use is made of an appropriate food or other such known lure (not shown) which is advantageously placed in one of the rearwardly disposed enclosures of the trap. Additionally, and as is implied from the foregoing description, the effect of the trap 1 is lost if the construction thereof is such as to render it difficult to make entrance into the trap. Thus, the fact that the surface of the bottom panel 19 extends throughout the trap and, more particularly, the presence of this panel is detected by the roach at the approach and during passage through the various entrance openings into the enclosures promotes the entry of the roach or insect into the trap. This is in contrast to prior art enclosures in which there is no structure which is detected by the feelers of the insect immediately adjacent and beyond the entrance opening into the trap.

It has also been found that a roach is more likely to enter through a large rather than a small opening. Thus, the main opening 10 should be as large as possible and yet smaller than the usual distance A between the feelers of an average size roach. Immediately beyond the opening 10, however, there is formed the enclosure 3 which, it will be understood, is of a comparatively confined extent. It has been further found that a roach upon entering the enclosure 3 and discovering the confined nature thereof will be more apt to pass through any opening which it can readily project both its feelers, such opening being the next encountered opening 11. In this connection, opening 11 can be narrower in extent than opening 10 since the raoach will more readily pass through this narrower opening in attempting to escape from the confined quarters of the enclosure 3. Thus, taking advantage of this propensity in the behavior of roaches, it is possible to provide progressively narrower openings rearwardly along the length of the trap 1 with the assurance that despite the lessening in the size of these openings that the roach will attempt to make its way through these openings.

Attention is now directed to the second embodiment of an insect trap according to the present invention as illustrated in FIG. 4 and in which corresponding parts thereof are designed with the same reference numerals. This embodiment of the trap 1 differs from the previously described embodiment in that the main entrance opening 10 is formed by only one inwardly converging wall 18. Although a roach can more easily maneuver out of the enclosure 3 through the opening 10 by movement along the straight wall 17 which bounds the opening 10, this embodiment of the trap has nevertheless been found to be sufficiently effective for commercial purposes. An additional difference in this embodiment of the trap 1 is the use of curved walls 24 and 25 rather than straight walls to form an entrance opening into the enclosure 5. Still another difference is the use of modified curved walls 26 and 27 in which the internal surfaces 26a and 27a respectively are still outwardly diverging to minimize escape, but are not necessarily mirror images of the opposite surfaces of these walls.

In the third embodiment of a trap 1 according to the present invention and as illustrated in FIG. 5, insect movement to the interior of the trap is made from opposite directions through two main entrance openings 20 and 23, and then through interior openings 21 and 22 into the medial section of the trap.

From the foregoing it should be readily appreciated that the insect trap 1 hereof represents a very useful product for the safe elimination of roaches and similar insects. The trap 1 in all embodiments is susceptible of being economically mass produced and thus it is contemplated that the same will be disposable in nature after it has served its purpose. A particularly appropriate material for manufacture of the trap 1 is a transparent plastic which is injection molded. Other materials of construction, however, may also be employed in fabricating a trap according to the present invention. In other respects as well, a latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

In an insect trap of the type having walls defining an enclosure and in which two of said walls bound an entrance opening therebetween into said enclosure, each of said two walls having an external surface contiguous to said entrance opening and an internal surface similarly contiguous to said entrance opening and forming a part of the boundary of said enclosure, the improvement comprising a bottom panel operatively arranged to serve as a lower surface for said enclosure and forming the lower edge of said entrance opening, and each of said two walls having an operative position normal to said bottom panel and oriented to converge inwardly to said entrance opening such that together their external surfaces are effective to cam together the normally diverging antennae of insects crawling on said bottom panel during entering movement thereof into said enclosure and such that together their internal surfaces are effective to cam apart the antennae of insects during reverse direction escaping movement thereof from said enclosure, whereby said external wall surfaces facilitate entering movement of said insects into said enclosure and said internal wall surfaces minimize escaping movement thereof from within said enclosure.

References Cited

UNITED STATES PATENTS

| | | | |
|---|---|---|---|
| 464,343 | 12/1891 | Nile | 43—107 |
| 812,761 | 2/1906 | Meier | 43—121 |
| 1,120,046 | 12/1914 | Fritsch | 43—119 |
| 1,485,867 | 3/1924 | Mooney | 43—121 |
| 1,578,061 | 3/1926 | Abadie | 43—121 |
| 1,812,512 | 6/1931 | Carballo | 43—119 |
| 2,786,298 | 3/1957 | Smith | 43—118 |

SAMUEL KOREN, *Primary Examiner.*

WARNER H. CAMP, *Examiner.*